United States Patent [19]

Kunihiro et al.

[11] Patent Number: 5,419,814
[45] Date of Patent: May 30, 1995

[54] THIN LAYER LIQUID FILM TYPE EVAPORATOR

[75] Inventors: Takatoshi Kunihiro; Takao Katayama, both of Chiba; Shinichi Ariga; Mitsuo Tanuma, both of Saitama, all of Japan

[73] Assignees: Idemitsu Kosan Corporation Limited; Tokyo Rikakikai Co., Ltd., both of Tokyo, Japan

[21] Appl. No.: 141,657

[22] Filed: Oct. 26, 1993

[30] Foreign Application Priority Data

Oct. 29, 1992 [JP] Japan .................................. 4-291508

[51] Int. Cl.⁶ ........................... B01D 1/22; B01D 3/28
[52] U.S. Cl. ........................................ 202/236; 159/5; 159/131; 159/28.2; 159/28.6; 202/188; 202/189
[58] Field of Search ................ 159/28.2, 28.6, 5, 13.1, 159/49, 48.1, 43.1; 202/236, 262, 188, 189, 191, 197; 203/89, 88

[56] References Cited

U.S. PATENT DOCUMENTS

| | | | |
|---|---|---|---|
| 1,762,898 | 6/1930 | Sorenson | 203/DIG. 17 |
| 2,894,879 | 7/1959 | Hickman | 203/DIG. 17 |
| 3,620,282 | 11/1971 | Newton | 159/13.4 |
| 3,620,283 | 11/1971 | Brown | 202/236 |
| 3,930,958 | 1/1976 | Maruichi | 202/174 |
| 4,166,773 | 9/1979 | Higley et al. | 202/153 |
| 4,786,363 | 11/1988 | Elmore et al. | 202/236 |
| 5,185,060 | 2/1993 | Yamasaki et al. | 202/236 |
| 5,254,219 | 10/1993 | Feres | 202/236 |

*Primary Examiner*—Virginia Manoharan
*Attorney, Agent, or Firm*—Armstrong, Westerman, Hattori, McLeland & Naughton

[57] ABSTRACT

A thin layer liquid film type evaporator including a cylindrical heating column, a heater for heating the cylindrical heating column, a liquid film forming plate disposed in the cylindrical heating column, a baffle also disposed in the cylindrical heating column and a feed nozzle disposed at the upper center of the cylindrical heating column. The liquid film forming plate has an outer diameter such that a clearance may be formed between the outer edge thereof and the inner circumferential surface of the heating column and that the liquid may flow through the clearance. Thus, a thin layer liquid film type evaporator which has a simple mechanism and can exhibit excellent evaporation efficiency can be provided.

11 Claims, 8 Drawing Sheets

THIN LAYER LIQUID FILM TYPE EVAPORATOR

BACKGROUND OF THE INVENTION AND RELATED ART STATEMENT

This invention relates to a thin layer liquid film type evaporator, more particularly to a thin layer liquid film type evaporator used for separation and purification of mineral oils and solvents or condensation of substances which are not very susceptible to thermal cracking.

In the conventional apparatuses for separating and recovering a low boiling point component from a liquid mixture (feed), a combination of an evaporator and a condenser has frequently been employed. As the evaporator employed for such purposes, there is known a thin layer liquid film type evaporator, in which the feed is adapted to flow along the inner circumferential surface of a heating column in the form of a thin film so as to effectively evaporate the low boiling point component.

As a means for forming thin layer liquid film on the inner circumferential surface of the heating column in such thin layer liquid film evaporator, an impeller disposed at the upper central portion of the heating column so as to splash the feed against the inner circumferential surface of the heating column or a conical liquid film forming plate disposed at the uppermost position of the heating column so as to allow the feed to flow in the form of a film through the clearance formed between the outer edge of the film forming plate and the inner circumferential surface of the heating column is frequently employed.

However, in the case of the former, the drive unit for driving the impeller and the drive shaft of the impeller must be sealed, so that the constitution of the apparatus is complicated, leading unavoidably to rise in the production cost, and that maintenance of the rotary drive section becomes necessary.

Meanwhile, in the case of the latter, although the evaporator can be manufactured at a low cost because of its simple structure, it involves a problem that it is difficult to form appropriately a liquid film over the entire inner circumferential surface of the heating column but form a discontinuous film containing dry portions, lowering evaporation efficiency and causing coking of the heavy ends at the interfaces of the wet portions and dry portions.

SUMMARY OF THE INVENTION

Therefore, it is an object of the invention to provide a thin layer liquid film type evaporator which has a simple mechanism and can exhibit excellent evaporation efficiency.

A first aspect of the invention relates to a thin layer liquid film type evaporator comprising a cylindrical heating column, a heating means for heating the cylindrical heating column, a liquid film forming plate disposed in the cylindrical heating column, a baffle also disposed in the cylindrical heating column and a feed nozzle disposed at the upper position of the cylindrical heating column, wherein the liquid film forming plate has an outer diameter such that a clearance may be formed between the outer edge thereof and the inner circumferential surface of the heating column and that the liquid may flow through the clearance (liquid flow clearance).

According to this constitution, the feed supplied through the feed nozzle to the upper portion of the cylindrical heating column flows in the form of a thin layer liquid film through the liquid flow clearance formed between the liquid film forming plate and the inner circumferential surface of the heating column down along the inner circumferential surface of the heating column to form a liquid flow having a uniform film thickness over the entire circumferential surface of the heating column, whereby to improve evaporation efficiency. Meanwhile, the mist or condensate included in the ascending vapor current lose kinetic energy during the course of ascending and are entrapped by the baffle to be refluxed and combined with the liquid flowing down the liquid film forming plate.

A second aspect of the invention relates to the thin layer liquid film type evaporator as described in the first aspect of the invention, wherein the liquid film forming plate and the baffle are disposed in plural numbers respectively.

Accordingly, a uniform thickness of liquid flow can be formed over the entire inner circumferential surface of the heating column with the aid of the respective liquid film forming plates, and thus evaporation efficiency can further be enhanced. Meanwhile, in the thus constituted thin layer liquid film type evaporator, the liquid film is formed on the inner circumferential surface of the heating column with the aid of the plurality of liquid film forming plates arranged vertically, so that the liquid film can be formed in an optimum state over the entire inner circumferential surface of the heating column using a simple mechanism to greatly increase evaporation efficiency and that coking of the heavy ends attributable to the presence of dry portions in the liquid film can absolutely be prevented.

A third aspect of the invention relates to the thin layer liquid film type evaporator as described in the first aspect of the invention, wherein the liquid film forming plate has a truncated conical surface with an opening defined at the center, and the baffle has a conical shape.

A fourth aspect of the invention relates to the thin layer liquid film type evaporator as described in the first aspect of the invention, wherein the liquid film forming plate has a truncated dome-like surface with an opening defined at the center, and the baffle has a dome-like shape.

Since the liquid film forming plate is designed to have a truncated conical form or a truncated dome-like surface, and since the baffle has a conical shape or a dome-like shape, the liquid can flow smooth. The opening formed at the center of the liquid film forming plate allows the component to be evaporated to pass upward therethrough.

A fifth aspect of the invention relates to the thin layer liquid film type evaporator as described in the first aspect of the invention, wherein the baffle has an outer diameter smaller than the outer diameter of the liquid film forming plate and greater than the diameter of the opening.

A sixth aspect of the invention relates to the thin layer liquid film type evaporator as described in the first aspect of the invention, wherein the feed nozzle is of hollow cone spray type which sprays out the feed into a form of ring and is disposed at the center of the cylindrical heating column.

Thus, the feed can be fed uniformly into the heating column.

A seventh aspect of the invention relates to the thin layer liquid film type evaporator as described in the first aspect of the invention, wherein the heating means is a heating jacket disposed to surround the cylindrical heating column, and the feed tube connected to the feed nozzle is partly housed in the heating jacket.

Since the feed can thus be preheated to an optimum temperature before introduced to the heating column, evaporation efficiency can further be improved.

An eighth aspect of the invention relates to the thin layer liquid film type evaporator as described in the first aspect of the invention, wherein the diameter of the cylindrical heating column is designed to be greater at the upper portion than at the lower portion.

Accordingly, the film forming area of the cylindrical heating column is increased, and the velocity of the ascending vapor current becomes lower, so that evaporation efficiency can be improved in the cases where a large amount of component to be evaporated is contained in the feed and the like.

A ninth aspect of the invention relates to the thin layer liquid film type evaporator as described in the first aspect of the invention, wherein the cylindrical heating column is directly connected at the upper portion to a condenser.

A tenth aspect of the invention relates to the thin layer liquid film type evaporator as described in the first aspect of the invention, wherein the cylindrical heating column is directly connected at the lower portion to a condenser.

Accordingly, the transfer line connecting the cylindrical heating column and the condenser can be omitted.

BRIEF DESCRIPTION OF THE DRAWINGS

The features of this invention that are believed to be novel are set forth with particularity in the appended claims. The invention, together with the objects and advantages thereof, may best be understood by reference to the following description of the preferred embodiments taken in conjunction with the accompanying drawings in which:

DESCRIPTION OF THE PREFERRED EMBODIMENT

Figure 1:
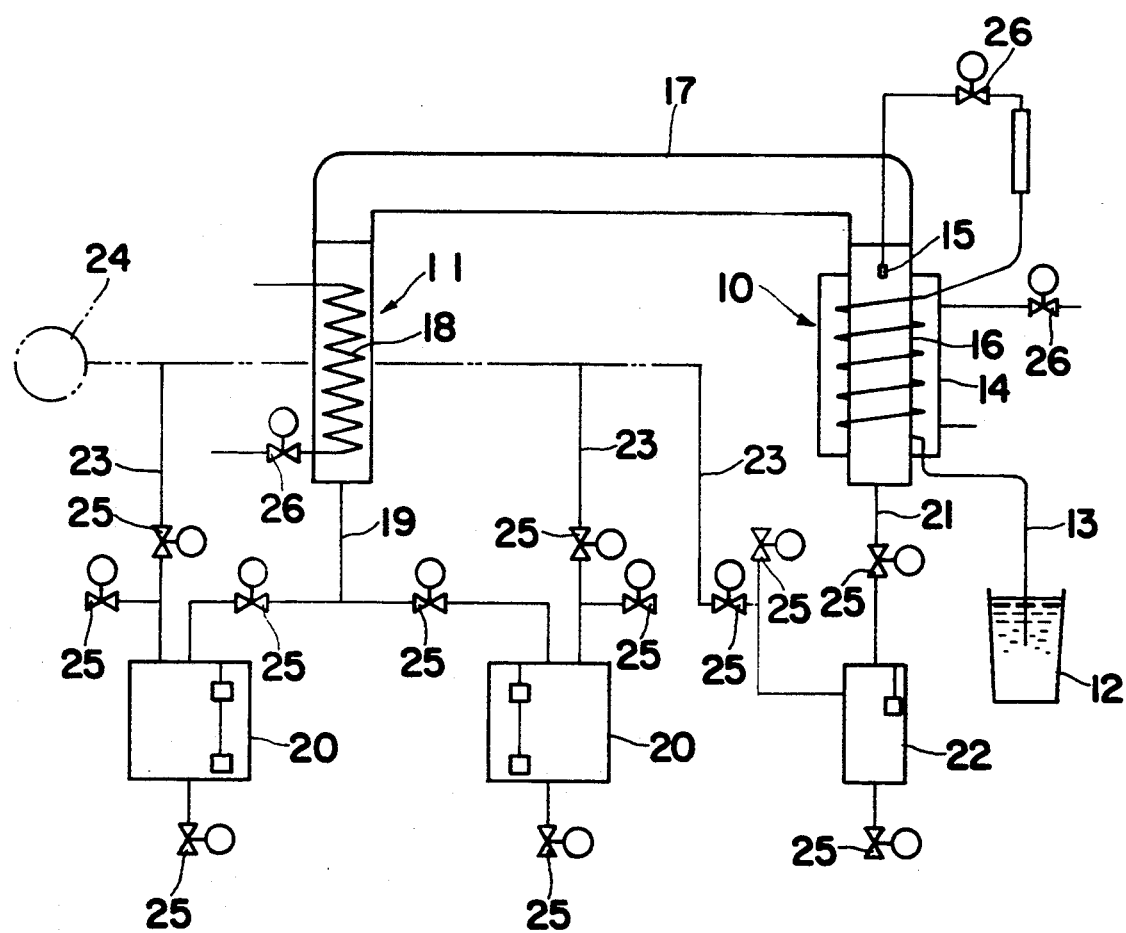
FIG. 1 shows a schematically an example of solvent recovering apparatus employing the thin layer liquid film type evaporator of the invention.
Figure 2:
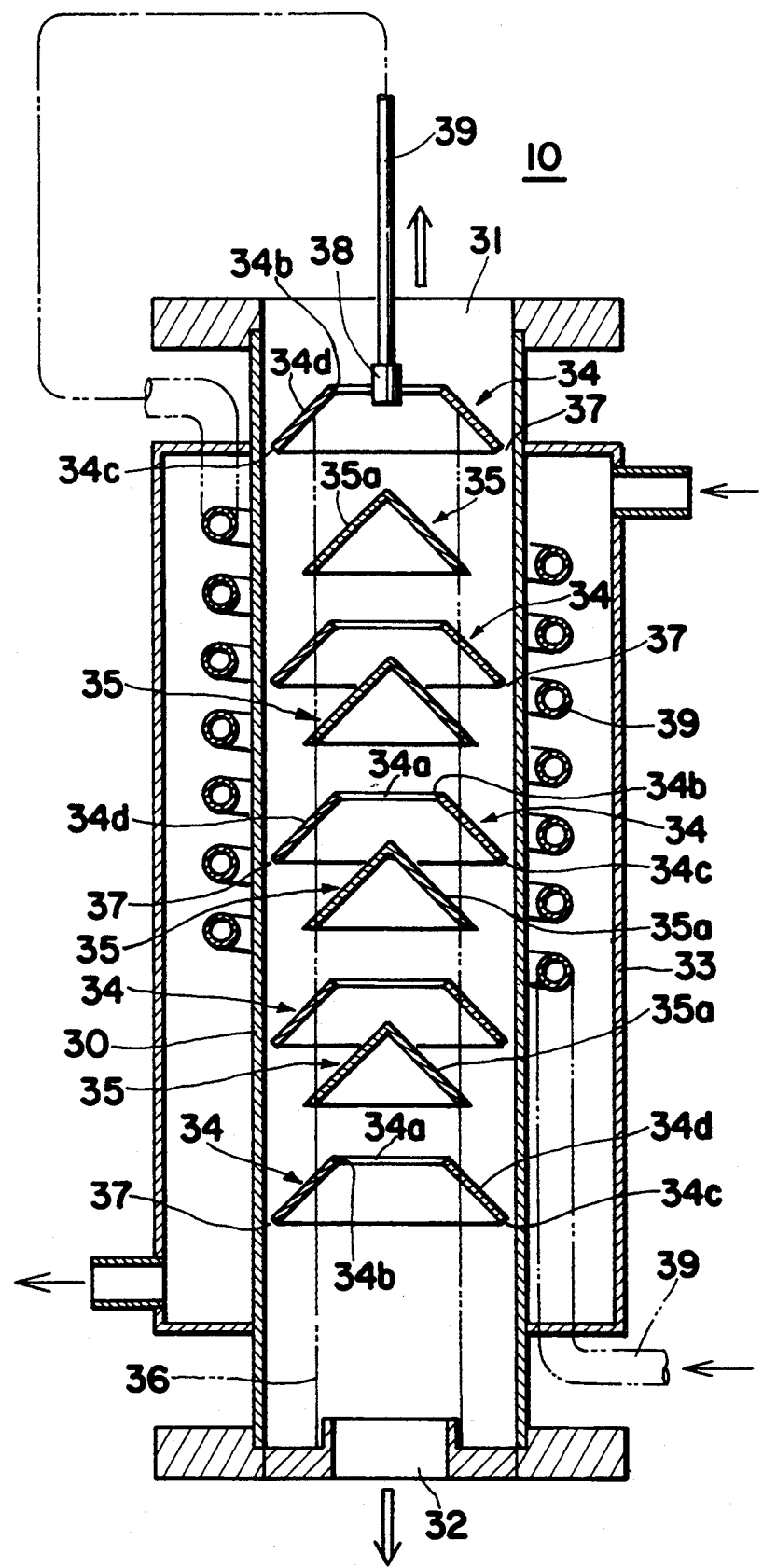
FIG. 2 shows in vertical cross section the thin layer liquid film type evaporator according to a first embodiment of the invention.

This invention will be described below more specifically based on the embodiments shown in the drawings.

The solvent recovering apparatus shown in FIG. 1 is used, for example, for recovering the solvent component in a washing solvent, in which the solvent in the feed is separated by evaporation in a thin layer liquid film type evaporator (hereinafter simply referred to as evaporator) 10 and the vapor is condensed in the condenser 11 to recover the solvent component.

Namely, the used solvent containing impurities is fed from a feed tank 12 through a feed tube 13 to a heating jacket 14 of the evaporator 10, where the feed is preheated. The thus preheated feed is fed through a feed nozzle 15 to a heating column 16. The feed fed to the heating column 16 is heated in the evaporator 10, and thus the volatile solvent component is evaporated to be separated from the heavy ends containing the high boiling point impurities.

The vaporized solvent component is fed through a transfer line 17 provided at the top of the heating column 16 to the condenser 11 to be cooled and condensed by the coolant in a cooling tube 18 of the condenser 11. The condensed solvent component is recovered through a draw off line 19 into a solvent tank 20. Meanwhile, the residual heavy ends containing high boiling point impurities in the evaporator 10 is withdrawn from a drain line 21 connected to the bottom of the evaporator 10 to a drainage tank 22.

The solvent tank 20 and the drainage tank 22 are connected by vacuum lines 23 respectively to a vacuum pump 24. Accordingly, the system of the evaporator 10, the condenser 11, etc. can be maintained at a predetermined degree of vacuum, whereby the feed is sucked and fed into the evaporator 10.

Incidentally, the solvent recovering apparatus is provided with two solvent tanks 20, so that the apparatus may be operated continuously by changing over between the two solvent tanks 20. The lines connected to the respective tanks are provided with valves 25 which are used to draw off the solvent or residual heavy ends. The feed tube 13, heating jacket 14 and the cooling tube 18 are provided with flow control valves 26 respectively.

Now, a first embodiment of the evaporator 10 employable in the above solvent recovering apparatus will be described referring to FIGS. 2 to 5.

The reference number 30 denotes a cylindrical heating column disposed vertically. The heating column 30 has an outlet 31 at the top and a drain port 32 at the bottom and is surrounded by a jacket 33. In the heating column 30, a plurality of liquid film forming plates 34 are arranged vertically at predetermined spaces with a baffle 35 being disposed below liquid film forming plate 34. The liquid film forming plates 34 and baffles 35 are supported by a suitable support 36 in the heating column 30.

The liquid film forming plates 34 each have a truncated conical form with an opening 34a defined at the center and is of an annular plate material having an inclined surface 34d sloping from the opening edge 34b of the opening 34a down to the outer edge 34c. The liquid film forming plate 34 is designed to have an outer diameter slightly smaller than the inner diameter of the heating column 30 so as to define a liquid flow clearance 37 between the outer edge 34c and the inner circumferential surface of the heating column 30.

The baffles 35 each have a conical form and is designed to have an outer diameter smaller than the outer diameter of the liquid film forming plate 34 and greater than the diameter of the opening 34a. The baffle 35 is of a plate material having a conical surface 35a, so that the droplets of the liquid flowing down along the conical surface 35a may drop from the outer edge 35b onto the inclined surface 34d of the liquid film forming plate 34.

The liquid film forming plate 34 and the baffle 35 which are disposed at the uppermost positions can also receive the droplets of the liquid entrapped by a mist collector disposed immediately above the heating column 30.

A feed nozzle 38 is disposed at the upper center of the heating column 30, and a feed tube 39 is connected to the feed nozzle 38. The feed fed through the feed tube 39 to the feed nozzle 38 is sprayed out toward the conical surface 35a of the uppermost baffle 35 and the inner circumferential surface of the heating column 30 and flows down onto the inclined surface 34d of the next lower liquid film forming plate 34.

In this process, since the feed tube 39 is partly housed in the heating jacket 33 to wind the heating column 30, the feed can be heated up to around the boiling point of the component to be evaporated with the aid of a heating medium such as steam supplied to the jacket 33 in the portion of the feed tube 39 housed in the jacket 33 before fed to the feed nozzle 38.

Figure 4:
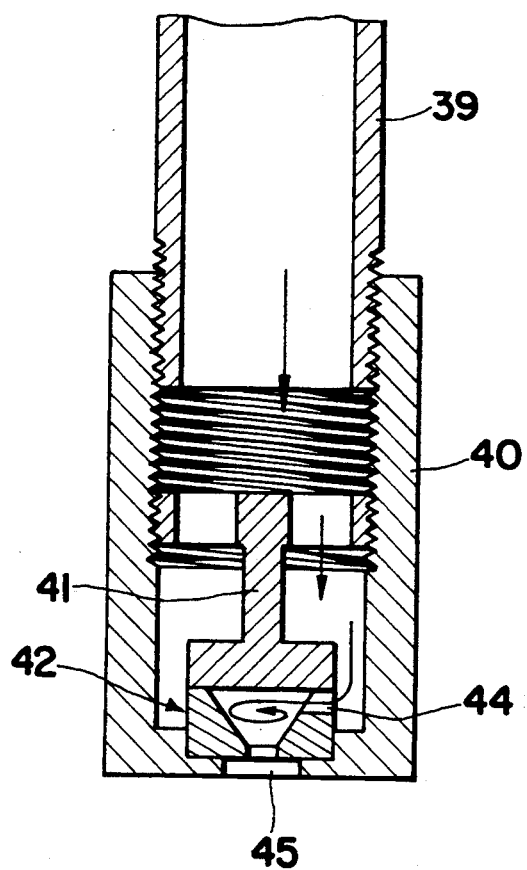
FIG. 4 shows in cross section an example of hollow cone spray type feed nozzle which sprays out the feed into a form of ring.
Figure 5:
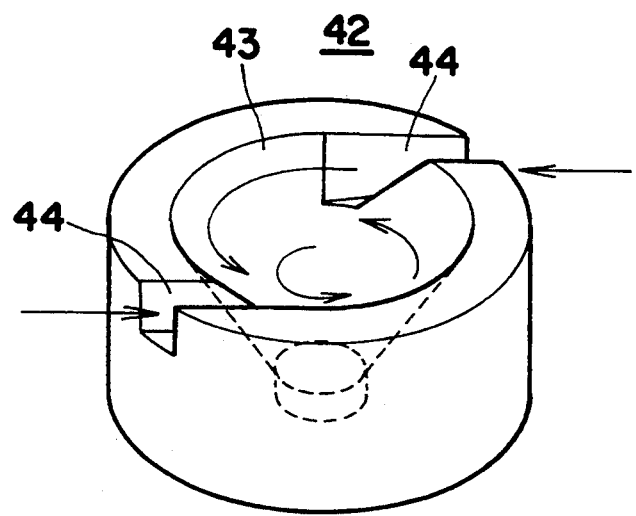
FIG. 5 shows a perspective view of a hollow cone spray type piece in the feed nozzle shown in FIG. 4.

If a hollow cone spray type nozzle is employed as the feed nozzle 38, the feed can be sprayed from the center of the heating column 30 into a form of ring, and thus the feed can be fed uniformly into the heating column 30. In the hollow cone spray type feed nozzle, as shown in FIG. 4, a nozzle cylinder 40 is screwed onto the tip of the feed tube 39, and a hollow cone spray type piece 42 is disposed via a holder 41 in the nozzle cylinder 40.

The piece 42 has an inverted conical cavity at the center with grooves 44 being defined on the tangential lines of the inner circumferential wall surface 43 of the cavity.

Accordingly, the feed fed through the feed tube 39 to the nozzle cylinder 40 is introduced through the grooves 44 into the cavity along the tangential lines of the inner circumferential wall surface 43 to form a vortex flow therein and sprayed out into a form of ring from the nozzle 45 at the tip of the nozzle cylinder 40.

Figure 3:
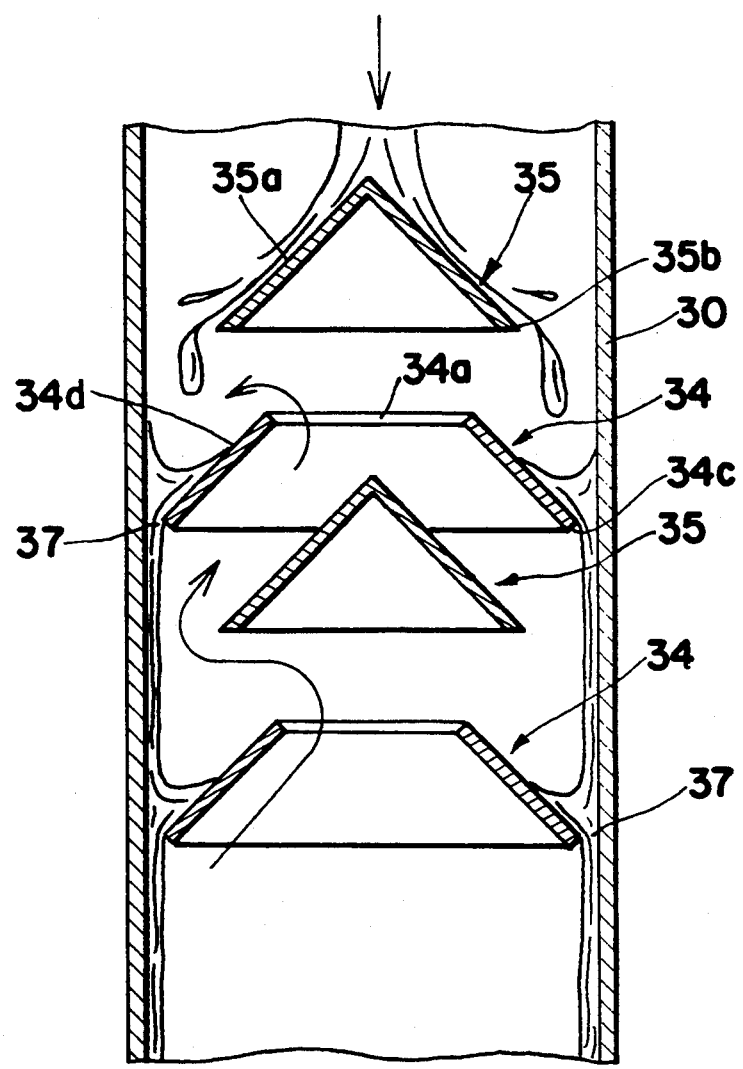
FIG. 3 is an explanatory view showing how the liquid flows in the cylindrical heating column of the thin layer liquid film type evaporator shown in FIG. 2.

To describe now the flow of the feed in the heating column 30, the feed sprayed out of the feed nozzle 38 to the conical surface 35a of the uppermost baffle 35 and the inner circumferential surface of the heating column 30 flows down onto the inclined surface 34d of the liquid film forming plate 34 locating therebelow and passes through the liquid flow clearance 37 defined between the outer edge 34c thereof and the inner circumferential surface of the heating column 30 to flow down further along the inner circumferential surface of the heating column 30 in the form of a liquid film having a predetermined thickness, as shown in FIG. 3.

The vapor formed during flowing down of the liquid ascends in the heating column 30 through the openings 34a of the liquid film forming plates 34 and the liquid flow clearances formed between the baffles 35 and the inner circumferential surface of the heating column 30 to be exhausted through the outlet 31 provided at the top. The residual liquid component flows on the lower liquid film forming plates 34 and down through the liquid flow clearance 37 in the form of a liquid film. Meanwhile, the mist and the like associated with the ascending vapor are entrapped immediately by the liquid film forming plates 34 and baffles 35 to be refluxed onto the lower liquid film forming plates 34. Thus, the mist and condensate containing the component to be evaporated are prevented from dropping directly onto the bottom of the heating column 30, in turn, from being discharged through the drain port 32.

As described above, since a plurality of liquid film forming plates 34 are arranged vertically at predetermined spaces, a liquid film having a uniform thickness can continuously be formed on the inner circumferential surface of the heating column 30 with the aid of the respective liquid film forming plates 34.

Namely, an optimum thickness of liquid film can be formed on the inner circumferential surface of the heating column 30 by setting the intervals between the liquid film forming plates 34 and the size of the liquid flow clearances 37 depending on the composition of the feed, the component to be recovered, the length of the heating column 30, heating temperature, etc., and thus evaporation efficiency in the evaporator can greatly be increased.

Since the feed is heated in the heating jacket 33 before sprayed into the heating column 30, the volatile component starts evaporating immediately after the feed is sprayed out of the feed nozzle 38, so that evaporation efficiency can further be enhanced. This heating of the feed in the heating jacket 33 also lowers the viscosity thereof to allow smooth spraying of the feed out of the hollow cone spray type nozzle. Besides, the feed can be fed only by vacuum in the system without using a feed pump, leading to simplification of the evaporator system.

Figure 6:
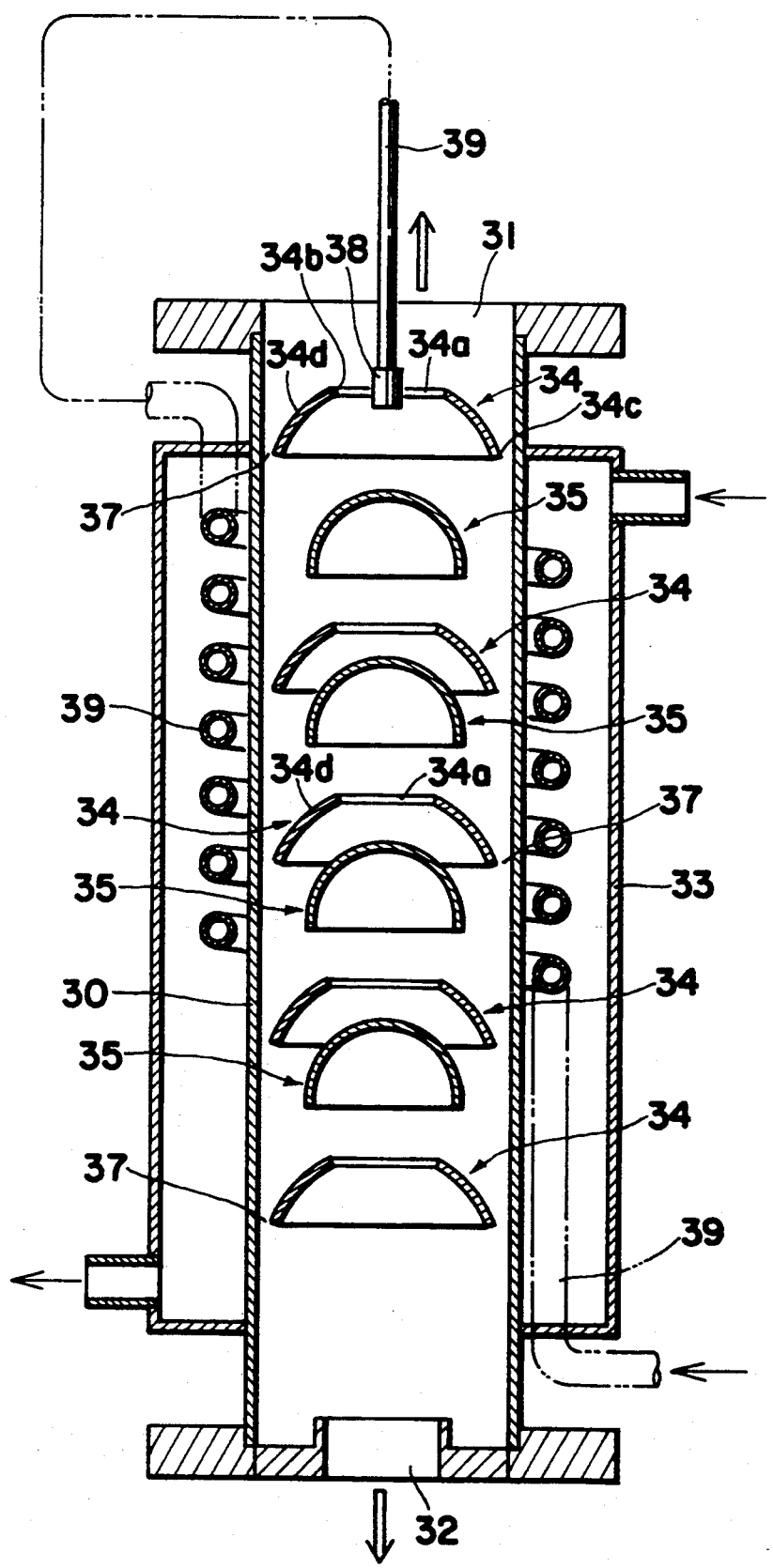
FIG. 6 shows in vertical cross section the thin layer liquid film type evaporator according to a second embodiment of the invention.

Next, a second embodiment of the evaporator 10 will be described referring to FIG. 6.

In the second embodiment, the liquid film forming plates 34 each have a truncated dome-like surface 34d with an opening 34a defined at the center, and the baffles 35 each have a dome-like shape.

The other respects are the same as in the first embodiment.

Figure 7:
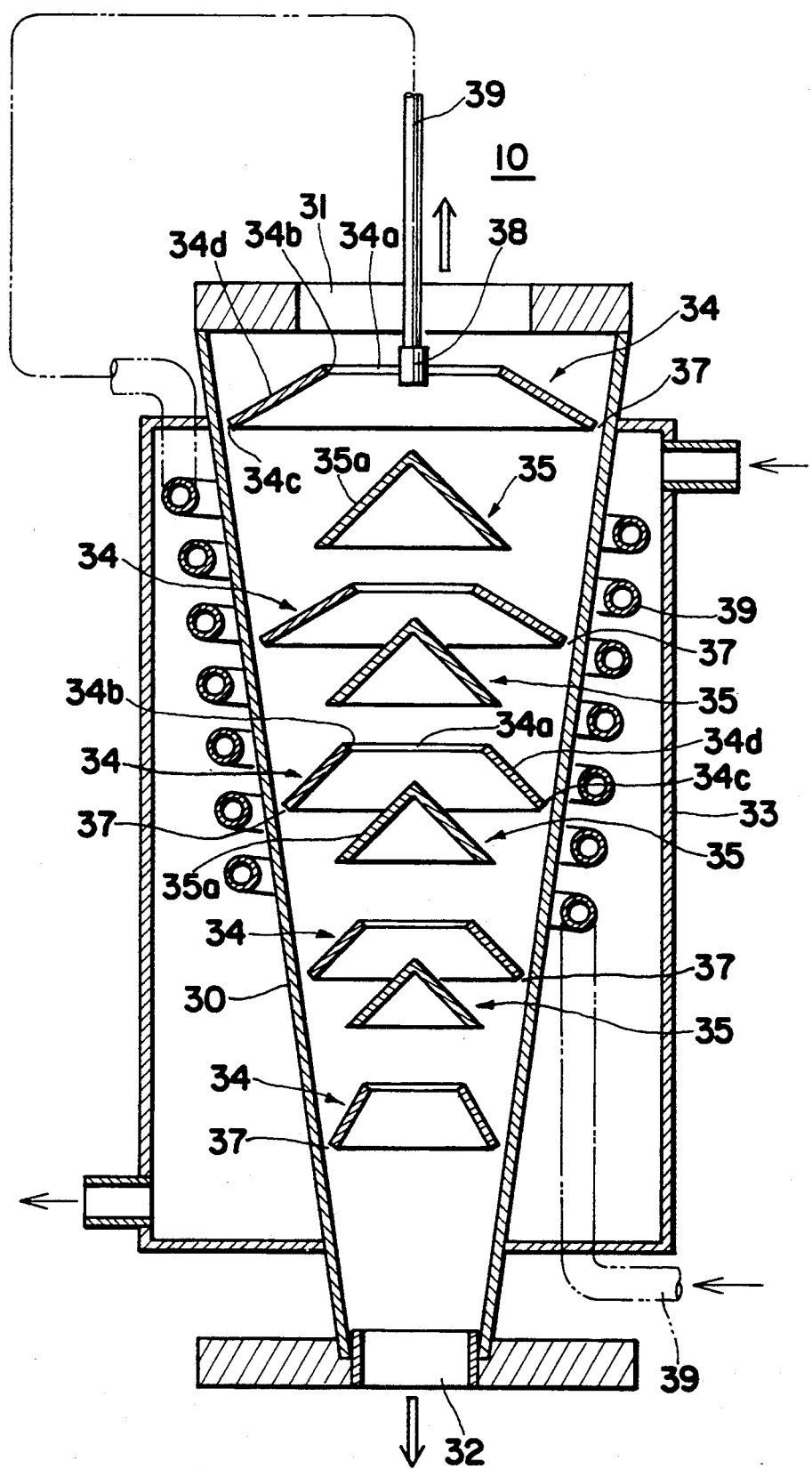
FIG. 7 shows in vertical cross section the thin layer liquid film type evaporator according to a third embodiment of the invention.

A third embodiment of the evaporator 10 will be described referring to FIG. 7.

In the third embodiment, the heating column 30 has a greater diameter at the upper portion than at the lower portion.

Further, the liquid film forming plates 34 are designed to have gradually reduced diameters downward so that substantially the same liquid flow clearances 37 may be formed between the respective outer edges 34c thereof and the inner circumferential surface of the heating column 30. The baffles 35 are designed to have outer diameters smaller than those of the corresponding liquid film forming plates 34 disposed thereabove and greater than the diameters of the openings 34a, respectively.

The other respects are the same as in the first embodiment.

By increasing the diameter of the heating column 30 at the upper portion than at the lower portion, the liquid film forming area of the heating column 30 can be increased to maintain the flow of the liquid film in the axial direction of the heating column 30 in appropriate condition and reduce the velocity of the ascending vapor current. Accordingly, evaporation efficiency can be improved in the cases where the feed contains a large amount of component to be evaporated and the like.

Figure 8:
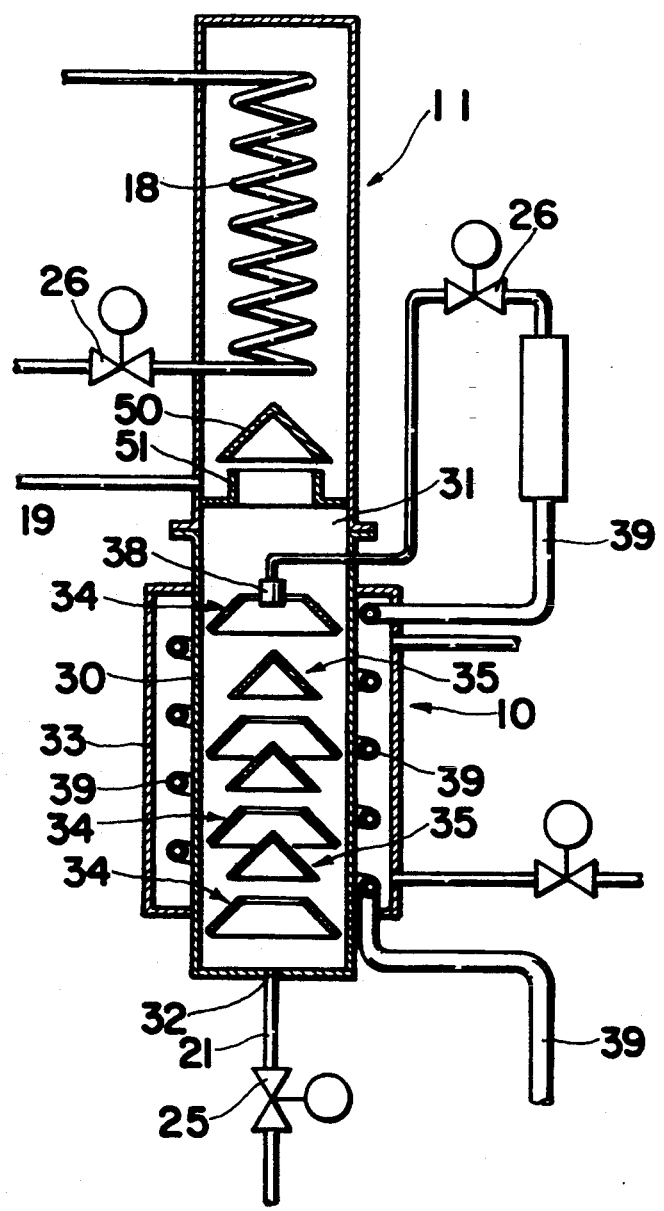
FIG. 8 shows in vertical cross section the thin layer liquid film type evaporator according to a fourth embodiment of the invention.

A fourth embodiment of the evaporator 10 will be described referring to FIG. 8.

In the fourth embodiment, a condenser 11 is directly disposed at the top of the cylindrical heating column 30 of the evaporator 10 having the same constitution as in the first embodiment.

The reference number 50 denotes a baffle interposed between the cooling tube 18 in the condenser 11 and the outlet 31, while 51 a condensate well disposed between the baffle 50 and the outlet 31.

Figure 9:
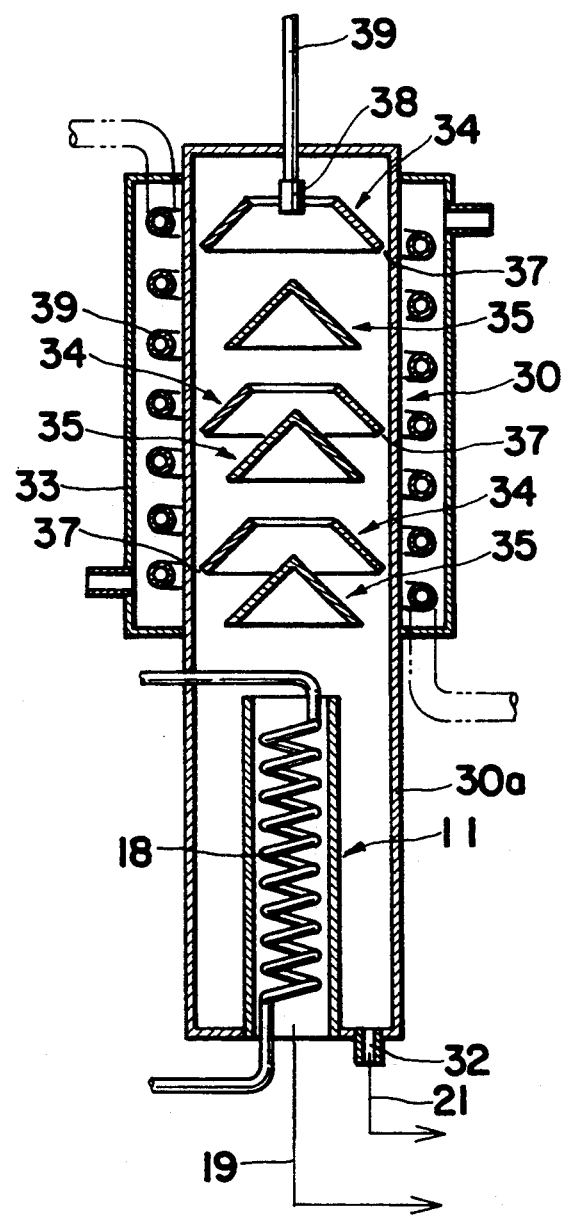
FIG. 9 shows in vertical cross section the thin layer liquid film type evaporator according to a fifth embodiment of the invention.

A fifth embodiment of the evaporator 10 will be described referring to FIG. 9.

The heating column 30 is extended downward and has a drain port 32 at the bottom of the extended portion 30a. A condenser 11 is disposed in the extended portion 30a of the heating column 30, and a cooling tube 18 is disposed in the condenser 11.

The residual heavy ends containing high boiling point impurities in the heating column 30 is withdrawn from the drain port 32 and recovered. The vapor formed by evaporation descends in the heating column 30 passing through the openings 34a of the liquid film forming plates 34 and the clearances formed between the baffles 35 and the inner circumferential surface of the heating column 30, condensed in the condenser 11 and recovered through the draw off line 19.

The other respects are the same as in the first embodiment.

Accordingly, the transfer line connecting the cylindrical heating column and the condenser can be omitted in the fourth and fifth embodiments.

Although five embodiments of the present invention have been described herein, it should be apparent to those skilled in the art that the present invention may be embodied in many other specific forms without departing from the spirit or scope of the invention.

Therefore, the present example and embodiment are to be considered as illustrative and not restrictive and the invention is not to be limited to the details given herein, but may be modified within the scope of the appended claims. claims.

What is claimed is:

1. A thin layer liquid film evaporator comprising:
   a cylindrical heating column, a heating means for heating the cylindrical heating column,
   a means for forming a thin layer liquid film which comprises:
   a liquid film forming plate with an opening disposed in said cylindrical heating column, a baffle disposed in said cylindrical heating column, and
   a feed nozzle disposed at the top of said cylindrical heating column,
   wherein said liquid film forming plate has an outer diameter such that a clearance is formed between the outer edge thereof and the inner circumferential surface of said heating column and such that the liquid flows through said clearance to form the thin layer liquid film, and said baffle has an outer diameter smaller than the outer diameter of said liquid film forming plate and greater than the diameter of said opening and said liquid film forming plate and said baffle are open downwardly and each with an increasing cross sectional diameter in the downward direction.

2. The thin layer liquid film evaporator according to claim 1, wherein a plurality of each of said liquid film forming plate and said baffle are provided.

3. The thin layer liquid film evaporator according to claim 1, wherein said liquid film forming plate has a truncated conical surface with said opening defined at the center, and said baffle has a conical shape.

4. The thin layer liquid film evaporator according to claim 1, wherein said liquid film forming plate has a truncated dome surface with said opening defined at the center, and said baffle has a dome-like shape.

5. The thin layer liquid film evaporator according to claim 1, wherein said feed nozzle is of hollow cone spray which sprays out the feed into a form of ring and is disposed at the center of said cylindrical heating column.

6. The thin layer liquid film evaporator according to claim 1, wherein said heating means is a heating jacket disposed to surround said cylindrical heating column, and a feed tube connected to said feed nozzle is partly housed in said heating jacket.

7. The thin layer liquid film evaporator according to claim 1, wherein the diameter of said cylindrical heating column is designed to be greater at the upper portion than at the lower portion.

8. The thin layer liquid film evaporator according to claim 1, wherein said cylindrical heating column is directly connected at the upper portion to a condenser.

9. The thin layer liquid film evaporator according to claim 1, wherein said cylindrical heating column is directly connected at the lower portion to a condenser.

10. The thin layer liquid film evaporator according to claim 1, wherein said liquid film forming plate and said baffle are separated from each other in a vertical direction of said cylindrical heating column.

11. The thin layer liquid film evaporator according to claim 1, wherein a clearance is further formed between an outer edge of said baffle and the inner circumferential surface of said heating column.

* * * * *